United States Patent [19]

Ellis

[11] 4,182,698

[45] Jan. 8, 1980

[54] HEAT STABILIZED POLYVINYL CHLORIDE DISPERSION RESINS

[75] Inventor: Ronald M. Ellis, Pottstown, Pa.

[73] Assignee: The Firestone Tire & Rubber Company, Akron, Ohio

[21] Appl. No.: 902,467

[22] Filed: May 3, 1978

[51] Int. Cl.$^2$ .................. C08F 114/06; C08K 5/16; C08K 5/21; C08K 5/31
[52] U.S. Cl. .................. 260/23 XA; 260/29.6 MN; 260/42.44; 260/45.9 AM
[58] Field of Search ............... 260/45.9 AM, 23 XA, 260/29.6 MN, 42.44

[56] References Cited

U.S. PATENT DOCUMENTS

| | | | |
|---|---|---|---|
| 2,367,483 | 1/1945 | Cheyney | 260/45.9 AM |
| 3,084,135 | 4/1963 | Scullin | 260/41 |
| 3,184,428 | 5/1965 | Hecker et al. | 260/45.9 AM |
| 3,194,786 | 7/1965 | Scullin | 260/41 |
| 3,463,756 | 8/1969 | Charnier et al. | 260/23 XA |
| 3,549,589 | 12/1970 | Meincke | 260/45.9 AM |
| 3,904,564 | 9/1975 | Mayo et al. | 260/23 XA |
| 3,975,325 | 8/1976 | Long | 260/23 XA |
| 4,057,672 | 11/1977 | Creekmore et al. | 260/23 XA |

FOREIGN PATENT DOCUMENTS

| | | |
|---|---|---|
| 616462 | 4/1962 | Belgium . |
| 1140705 | 6/1963 | Fed. Rep. of Germany . |
| 47-46445 | 9/1972 | Japan . |
| 6410105 | 3/1965 | Netherlands . |
| 986161 | 3/1965 | United Kingdom . |

OTHER PUBLICATIONS

Chemical Abstracts, vol. 58, No. 6, Mar. 18, 1963, p. 5844c.
Chemical Abstracts, vol. 63, No. 8, Oct. 11, 1965, p. 10135f.
Chemical Abstracts, vol. 80, 1974, p. 37934k.

*Primary Examiner*—Ronald W. Griffin

[57] ABSTRACT

Polyvinyl chloride dispersion resins are heat stabilized with (1) crystalline solid, water soluble, nitrogen containing organic heat stabilizers such as dicyandiamide, urea and guanidine salts in combination with (2) at least one water soluble organic salt of, for example, calcium or zinc.

6 Claims, No Drawings

HEAT STABILIZED POLYVINYL CHLORIDE DISPERSION RESINS

BACKGROUND OF THE INVENTION

It is well known in the industry that in order to process polyvinyl chloride into useful articles, a heat stabilizer must be incorporated into the compound to prevent polymer degradation. Typically, these stabilizers are bivalent metal ion salts of fatty acids or alkyl phenols alone or in combination with organic phosphite esters. The metal ions used are barium, calcium, cadmium, strontium, zinc, lead and tin. Effective heat stabilizers for polyvinyl chloride are tin compounds and combinations of barium and zinc or barium, cadmium and zinc alone or with the addition of an organic alkyl aryl phosphite. While these stabilizers are effective, their use is often limited due to their high cost or toxicological properties. In many case, non-toxic combinations of calcium and zinc must be used, even though they are much less effective.

The use of dicyandiamide (cyanoguanidine) has been recognized as a heat stabilizer for vinyl chloride copolymers. Several patents have been granted for the use of dicyandiamide, melamine, guanidine and chemically similar compounds as heat stabilizers specifically for vinyl chloride-vinyl acetate copolymers filled with asbestos for flooring compounds. No reference has been found, however, to its use singly or in combination with, for example, an organic salt of calcium, in stabilizing vinyl chloride dispersion resins. Dispersion resins, because of their use in plasticizer paste form, generally make use of liquid heat stabilizers in organic solvent mediums.

PRIOR ART

Typical polyvinyl chloride resins used in the prior art are suspension prepared resins in which the water used in polymerization is removed by filtration before drying. Water soluble stabilizers, if added before filtration, would be removed along with the filtrate. Therefore, the stabilizers were added as solids to the resin in the compounding step, a process which is impractical with dispersion resins because of their poor dispersibility under dispersion resin processing conditions. Since dispersion resins are prepared as latexes which are spray dried, any stabilizer added to the latex before spray drying remains in the resin in a finely dispersed condition after drying.

Typical prior art patents include the following; the substance of each is incorporated by reference:

(1) Belgian Patent No. 616,462

This patent discloses that polyvinylchlorides which contain asbestos having an iron content discolor when they are mixed in the presence of heat. This patent claims that the addition of a discoloration inhibitor such as, for example, dicyandiamide or guanidine, either inhibits discoloration or whitens a discolored polyvinyl chloride composition. There is no suggestion or teaching in this reference that any of the recommended additives can be utilized to stabilize vinyl chloride dispersion resins.

(2) Netherlands Patent Disclosure No. 6,410,105

This patent teaches the preparation of resinous compositions stabilized to heat and light that contain (1) a vinyl halide resin, (2) an inorganic filler, (3) a nitrogen containing compound such as dicyandiamide (4) an anhydride of a polycarboxylic acid. This reference does not teach or suggest applicant's heat stabilized polyvinyl chloride dispersion resin as described and claimed.

(3) West German Patent No. 1,140,705

This patent discloses the stabilization of polyvinyl chloride with use of hydrazides such as mono- or diarylated hydrazine compounds of halogenated aromatic monocarboxylic acids, with or without the addition of a slight amount of a dicyandiamide. This reference does not suggest the preparation of a heat stabilized polyvinyl chloride dispersion resin as described and claimed by applicant.

(4) British Patent No. 986,161

This patent is directed to the preparation of a heat stabilized composition of vinyl chloride resin, plasticizer, iron containing asbestos and dicyandiamide with or without the addition of calcium carbonate. Applicants heat stabilized polyvinyl chloride dispersion resin is not suggested by this prior art disclosure.

(5) U.S. Pat. No. 3,084,135

This patent discloses the heat stabilization of a vinyl halide resin with asbestos and melamine. This reference does not render obvious applicants described and claimed heat stabilized polyvinyl chloride dispersion resin or its preparation.

(6) U.S. Pat. No. 3,194,786

This patent describes the heat stabilization of asbestos filled vinyl halide resin with the use of dicyandiamide or mixtures thereof with an S-triazine such as melamine. Applicant's heat stabilized polyvinylchloride dispersion resin, and its method of preparation is not suggested by this reference.

(7) U.S. Pat. No. 2,367,483

This patent broadly teaches the heat stabilization of vinyl chloride with dicyandiamide. Applicant's heat stabilized polyvinyl chloride dispersion resin and its method of preparation is not suggested by this reference.

(8) Japanese Abstract No. 72 46,445

22 Sep. 1972 Appl. 71,986 02 Oct. 1968; 6 pp. The discoloration during the heating of poly(vinyl)chloride (I) [9002-86-2] molding compns. could be prevented by adding a stabilizer, e.g., Cd-Ba complex soap or tribasic lead phosphate, and a N-contg. compd., e.g. melamine [108-78-1]. I compn. also contained dioctyl phthalate epoxidized soybean oil, and brass powder.

The preceding references, when taken singly or in any reasonable combination thereof, would not suggest applicant's heat stabilization of polyvinyl chloride dispersion resin.

THE INVENTION

My invention is directed to the heat stabilization of polyvinyl chloride dispersion resins by incorporating therein the non-toxic combination of (1) a water soluble crystalline solid nitrogen containing organic heat stabilizer such as dicyandiamide, urea and guanidine salts and (2) at least one water soluble organic salt of calcium or zinc. These stabilizers have been used individually in vinyl chloride-vinyl acetate copolymer compositions for flooring or in dry blending operations where the plasticized resin can be mixed with solid stabilizers while heating, for example, in a banbury mixer. Dispersion resins, in contrast, must be mixed with plasticizers and stabilizers without heating and crystalline solid stabilizers are difficult to disperse under these conditions. For this reason, stabilizer solutions in organic solvents are generally used to stabilize dispersion resins by adding them to plasticizer-resin paste. By incorporating my non-toxic stabilizer composition into dispersion resins, I take advantage of their water solubility and add them in water solution to the dispersion resin latex before the spray drying step. On spray drying, my stabilizer composition is efficiently distributed throughout the resin and evidences a greater than additive heat stabilization effect in the dried resin.

This invention makes available a competitive vinyl dispersion resin which, when compounded with lower cost, non-toxic stabilizers, gives a compound with equivalent or better heat stability compared to a typical dispersion resin compounded with more costly and toxic stabilizers. If dicyandiamide or other N-containing material of this type is incorporated into a plastisol formulation along with either calcium or zinc organic salts, or combinations of the two, their performance as heat stabilizers is significantly improved. The compounder can thus advantageously use my effective non-toxic stabilizer system and not pay the penalty of decreased heat stability in his compound. A further significant result derived from my invention is to produce a resin, prestabilized with non-toxic stabilizers, which resin requires little or no additional stabilization by a resin user.

The heat stability of dispersion resins achieved in the practice of my invention includes improved short and long term heat stability. The use of organic solvents is avoided and the need for, for example, the use of expensive barium stabilizers is also avoided. In most instances, the prestabilized resin produced in the practice of my invention would not require additional heat stabilization by the resin user. My prestabilized polyvinyl chloride dispersion resin is characterized by reflecting improved heat stability when compared to the typical dispersion resin compounded with a known toxic stabilizer. The individual heat stabilization effect of the components of my non-toxic heat stabilizer composition is significantly improved by utilizing said components in combination. The total stabilizer level can range from about 0.1 to about 3.0 phr; below 0.1, little or no heat stabilization is achieved and more than 3.0 phr is not needed. My preferred range is from 0.5 to 1.5 phr.

The nitrogen containing component of my non-toxic stabilizing composition can range from about 0.1 phr to about 1.0 phr; my calcium and/or zinc organic salt component is utilized in an amount of from about 0.1 phr to about 1.0 phr, and from about 0.1 phr to about 1.0 phr, respectively. It is preferred to utilize my three component heat stabilization system; however, improved stabilization is achieved with a two component system of a nitrogen containing compound and a calcium organic salt or a zinc organic salt. When utilized as a three component composition, the zinc and a calcium organic salt components can be present in a ratio of from 1/3 to 3/1; optimization can be routinely determined.

Dicyandiamide and other N-containing materials utilized in the practice of my invention are crystalline solids of very limited solubility in organic solvents such as the plasticizers used in a dispersion resin paste compound. Thus, it is very difficult to incorporate these materials directly into the paste compound using existing techniques. The unique advantage of my invention can best be realized by a compounder without any added inconvenience if the materials of this invention are previously incorporated into the plastisol resin. This can be accomplished by adding the above mentioned materials, which are water soluble, to the plastisol latex prior to drying. Further advantage can be given to a compounder using a pre-stabilized resin if part or all of the typical non-toxic, calcium and/or zinc stabilizer system is incorporated into the resin along with the N-containing materials of this invention. Water soluble calcium and zinc compounds can easily be added to plastisol latex prior to spray drying. These materials are much less costly, pound for pound, than the plasticizer soluble calcium-zinc salts typically used as stabilizers. In addition, the water soluble calcium-zinc salts have higher stabilizer metal ion content per pound than do the plasticizer soluble compounds due to their lower molecular weights. Still further advantage is obtained by incorporating the smaller water soluble calcium-zinc molecules into a plastisol formulation because there is far less tendency for these materials to exude or spew from a fused compound due to incompatibility.

Included among these water soluble nitrogen containing organic compounds that can be utilized in the practice of my invention are urea, thiourea, dicyandiamide (cyanoguanidine), guanidine salts, such as guanidine carbonate and guanidine acetate, and their water soluble condensation polymers with formaldehyde. Particularly effective are the guanidine salts, especially guanidine carbonate and dicyandiamide.

The following example is representative and can be varied within the context of my total specification disclosure as it would be comprehended and practiced by one skilled in the art.

EXAMPLE

Plastisol resin can be pre-stabilized by adding certain non-toxic water soluble heat stabilizers to the latex prior to spray drying. These heat stabilizers are added at levels from 0.1-3.0 phr. The latex to be pre-stabilized is prepared via true emulsion or micro-suspension free radical polymerization. Made in either continuous or batch processes, a typical recipe consists of water and monomer along with an emulsifier, like sodium lauryl sulfate, and a free radical initiator such as potassium persulfate or dilauroyl peroxide. Materials used to advantage in the practice of this invention are water soluble nitrogen containing organic compounds such as urea, thiourea, dicyandiamide (cyanoguanidine), guanidine, guanidine salts, and water soluble condensation polymers of these materials with formaldehyde. Water soluble organic salts of calcium and zinc, including fatty acid salts of $C_2$ to $C_8$ chain length, saturated or unsaturated, and with or without hydroxyl substitution; salts of acid chain length up to $C_{20}$ can also be used if they are rendered soluble via complexation with ammonium hydroxide. These salts are utilized in combination with the nitrogen containing organic compound.

(a) Added to a dispersion resin PVC latex prepared via continuous emulsion polymerization were 0.25 phr dicyandiamide and 0.50 phr zinc acetate dihydrate. The dried resin compounded with 60 phr dioctyl phthalate compared to a control resin compounded with 60 phr dioctyl phthalate and 3.0 phr barium, cadmium, zinc stabilizer, showed equivalent heat stability, both samples failing at 35 minutes in the 180° C. heat stability test.

(b) In another example, to the latex mentioned above in (a) were added 0.25 phr dicyandiamide and 0.25 phr calcium acetate mono hydrate. The dried resin evaluated as above showed failure at 45 minutes versus 35 minutes for the control in 180° heat stability.

(c) In a third example, 0.25 phr dicyandiamide, 0.25 phr calcium acetate mono hydrate and 0.50 phr zinc acetate dihydrate were added to the above latex. Compounded and compared as above in the 180° C. heat stability test this resin failed at 45 minutes versus 35 minutes for the control.

In the preceding examples, the non-toxic composition of this invention equaled or surpassed the more costly, toxic stabilizer in overall heat stability protection. All heat stability tests were routinely made in a rotating carriage oven at 180° C. Pastes were drawn down at 20 mils, and fused from 10 minutes to failure at five-minute intervals.

A dispersion resin pre-stabilized by the addition of 0.1–1.0 phr dicyandiamide and 0.1–1.0 phr zinc acetate, or 0.1–1.0 phr calcium acetate; or combinations thereof to dispersion resin latex prior to spray drying will show up to 20 minutes improvement in 180° C. heat stability over a conventional dispersion resin control when both are compounded with 60 phr dioctyl phthalate and 3.0 phr of barium, cadmium, zinc stabilizer. The same pre-stabilized resin shows up to 20 minutes advantage in 180° C. heat stability over the control when compounded with only dioctyl phthalate and no other stabilizer. Furthermore, the pre-stabilized resin compounded with 60 phr dioctyl phthalate alone shows up to 10 minutes improvement in the 180° C. heat stability test over the control compounded with 60 phr dioctyl phthalate and 3.0 phr barium, cadmium, zinc stabilizer.

The preceding example can be varied by substituting any one, or mixtures, of the herein designated water-soluble crystalline nitrogen containing organic compounds together with at least one zinc and/or calcium organic salt as heat stabilizers to achieve substantially the same results; a minimum of routine experimentation and optimization may be required.

The heat stabilized resins produced in the practice of my invention can be used for any known dispersion resin application, including the manufacture of dipped and molded materials such as surgical gloves, doll heads and beach balls, etc.

What is claimed is:

1. Polyvinyl chloride dispersion resin heat stabilized with from about 0.1 phr to about 3.0 phr of a water soluble and non-toxic heat stabilizing composition consisting essentially of from about 0.1 phr to about 1.0 phr, as crystalline solid, water soluble, nitrogen containing organic compound, urea, thiourea, dicyandiamide, guanidine salts, and, their water soluble condensation polymers with formaldehyde, in combination with from about 0.1 phr to about 1.0 phr of at least one water soluble organic salt of calcium or zinc.

2. A heat stabilized polyvinyl chloride resin according to claim 1 wherein said organic salt is a saturated or unsaturated fatty acid salt of from $C_2$ to $C_{20}$ in chain length.

3. A heat stabilized polyvinyl chloride resin according to claim 2 wherein said fatty acid salt is hydroxyl substituted.

4. Polyvinyl chloride dispersion resin heat stabilized with from about 0.1 phr to about 3.0 phr of a water soluble and non-toxic heat stabilizing composition consisting essentially of from about 0.1 phr to about 1.0 phr dicyandiamide in combination with from about 0.1 phr to about 1.0 phr of calcium acetate.

5. Polyvinyl chloride dispersion resin heat stabilized with from about 0.1 phr to about 3.0 phr of a water soluble and non-toxic heat stabilizing composition consisting essentially of from about 0.1 phr to about 1.0 phr dicyandiamide in combination with from about 0.1 phr to about 1.0 phr of zinc acetate.

6. Polyvinyl chloride dispersion resin heat stabilized with from about 0.1 phr to about 3.0 phr of a water soluble and non-toxic heat stabilizing composition consisting essentially of from about 0.1 phr to about 1.0 phr dicyandiamide in combination with from about 0.1 phr to about 1.0 phr of calcium acetate and about 0.1 phr to about 1.0 phr of zinc acetate.

* * * * *